(No Model.)

G. B. DAVISON.
HARROW.

No. 562,711. Patented June 23, 1896.

Witnesses
Jas. H. Blackwood
H. P. Doolittle

Inventor
George B. Davison
by M. Doolittle & Son
Attorneys

UNITED STATES PATENT OFFICE.

GEORGE BENNETT DAVISON, OF UTICA, NEW YORK.

HARROW.

SPECIFICATION forming part of Letters Patent No. 562,711, dated June 23, 1896.

Application filed December 6, 1895. Serial No. 571,243. (No model.)

*To all whom it may concern:*

Be it known that I, GEORGE BENNETT DAVISON, a citizen of the United States, residing at Utica, in the county of Oneida and State of New York, have invented certain new and useful Improvements in Harrows; and I do hereby declare the following to be a full, clear, and exact description of the invention, such as will enable others skilled in the art to which it appertains to make and use the same.

My invention relates to harrows; and it consists in improvements in the construction of the frame of a double-winged harrow, especially of the spring-tooth variety.

The objects of my improvements are to reduce the number of parts of such a harrow-frame, and the mode of arrangement and connection of the parts, whereby a lighter and at the same time a stronger structure is obtained, and greater convenience and cheapness in construction.

My invention is illustrated in the accompanying drawings, in which—

Figure 1:
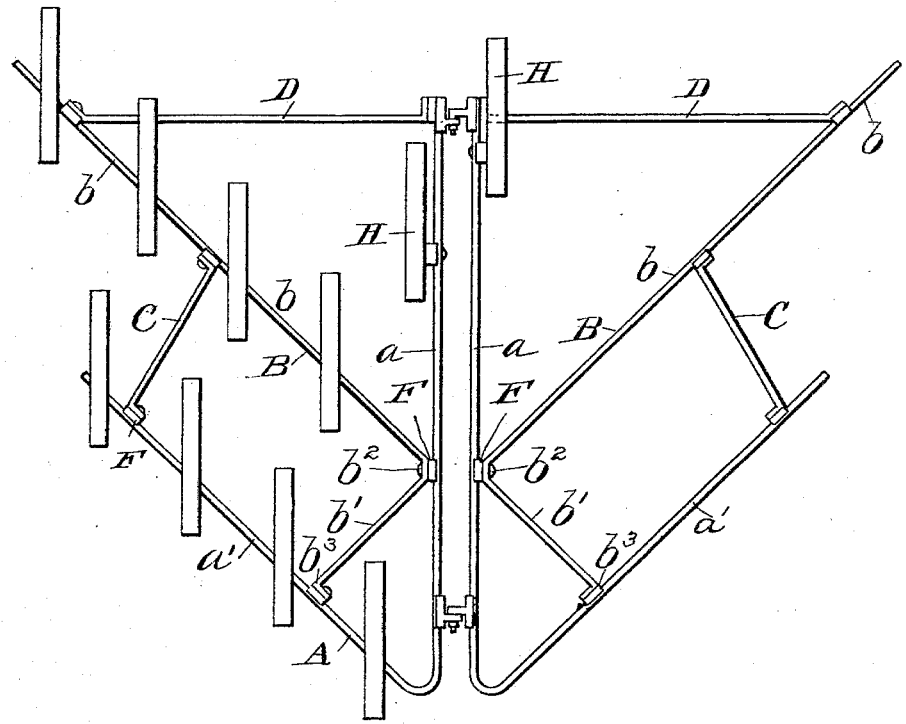
Figure 2:
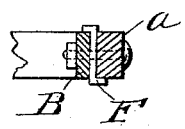

Figure 1 is a top plan view with the teeth of one wing of the harrow removed to better show the construction of the frame; and Fig. 2 a detail, partly in section, showing the mode of connection of draft and cross bars.

Referring to the drawings it will be seen that the harrow is composed of two sections, each section detachably and pivotally connected to the other at the center, so that each may be used without the other, and each automatically raised or rocked to clear obstructions independently of the other. It will also be seen that each section of the frame is composed of only four parts, namely, a single draft-bar, one combined draft and cross bar, and two independent cross-bars.

A is a single draft-bar in one piece, having one long straight arm $a$, and a shorter arm $a'$, bent at the top and falling at an acute angle to the longer arm.

B is a combined brace and cross-bar, in one piece, consisting of a long arm $b$, running at an acute angle to the draft-bar A, and a short cross-arm $b'$. The long arm is connected to the draft-bar A at the point $b^2$, and the cross-arm $b'$, connected to the short arm $a'$ of the draft-bar A at the point $b^2$.

C is a cross-bar parallel with the cross-arm $b'$ of bar B, and connected to the short arm $a'$ of bar A and the long arm $b$ of bar B.

D is a rear cross-bar connecting the long arm $a$ of draft-bar A, and the long arm $b$ of bar B. The long arms of A and B, and the rear cross-bar form a right-angled triangle—the long arm $b$ of bar B, however, extending out beyond the rear bar D, and also out beyond the outer short arm $a'$ of the draft-bar A. The mode of connection of these different bars, as shown in Fig. 2, is by a flanged washer F, having flanges $g$, extending in opposite directions and which embrace the edges of both connecting-bars, as shown, and which is held in place to secure the bars together by a screw-bolt and plate.

The harrow-teeth are preferably attached to the frame in the manner and in the positions shown in the drawings. Four teeth are placed upon the front arm of each draft-bar and four upon each main cross-bar, and to the rear part of the central arm $a$ of each draft-bar is secured a guide-tooth H. The object of these guide-teeth is to prevent sidewise swaying of the harrow and the trailing of the teeth caused by such motion. One guide-tooth is set in advance of the other.

Having thus described my invention, what I claim is—

1. A harrow-frame section, composed of four parts, namely, a draft-bar A, consisting of an outside diagonal arm and a shorter center arm in one piece, an inside brace B, consisting of a diagonal arm and a cross-arm in one piece, connecting the arms of the draft-bar, an independent cross-arm C connecting the longer arms of said draft-bar and brace, and a rear cross-bar D connecting the rear ends of said inside brace and center draft-arm, in combination with the means of connection, substantially as described.

2. A harrow-frame composed of two separable sections, each section consisting of a draft-bar having an arm running from the front center to the rear center of said frame, a combined brace-bar and cross-arm B in one piece, a single cross-arm connecting the arms of A and B, rear cross-bar D, and means for securing said bars together, in combination with harrow-teeth attached to said draft-bar and brace-bar, and a guide-tooth on the rear part of said central arm, substantially as and for the purpose described.

3. A harrow-frame composed of two sections, each section detachably and pivotally connected to the other at the center whereby each may be used without the other, and automatically raised or rocked independently of the other, each of said sections composed of a single draft and center bar A, a combined inner brace and cross-bar B, and two independent cross-bars C and D, substantially as described.

In testimony whereof I affix my signature, in presence of two witnesses.

GEORGE BENNETT DAVISON.

Witnesses:
FRED GIBSON,
ARTHUR E. COLE.